United States Patent Office 2,715,689
Patented Aug. 16, 1955

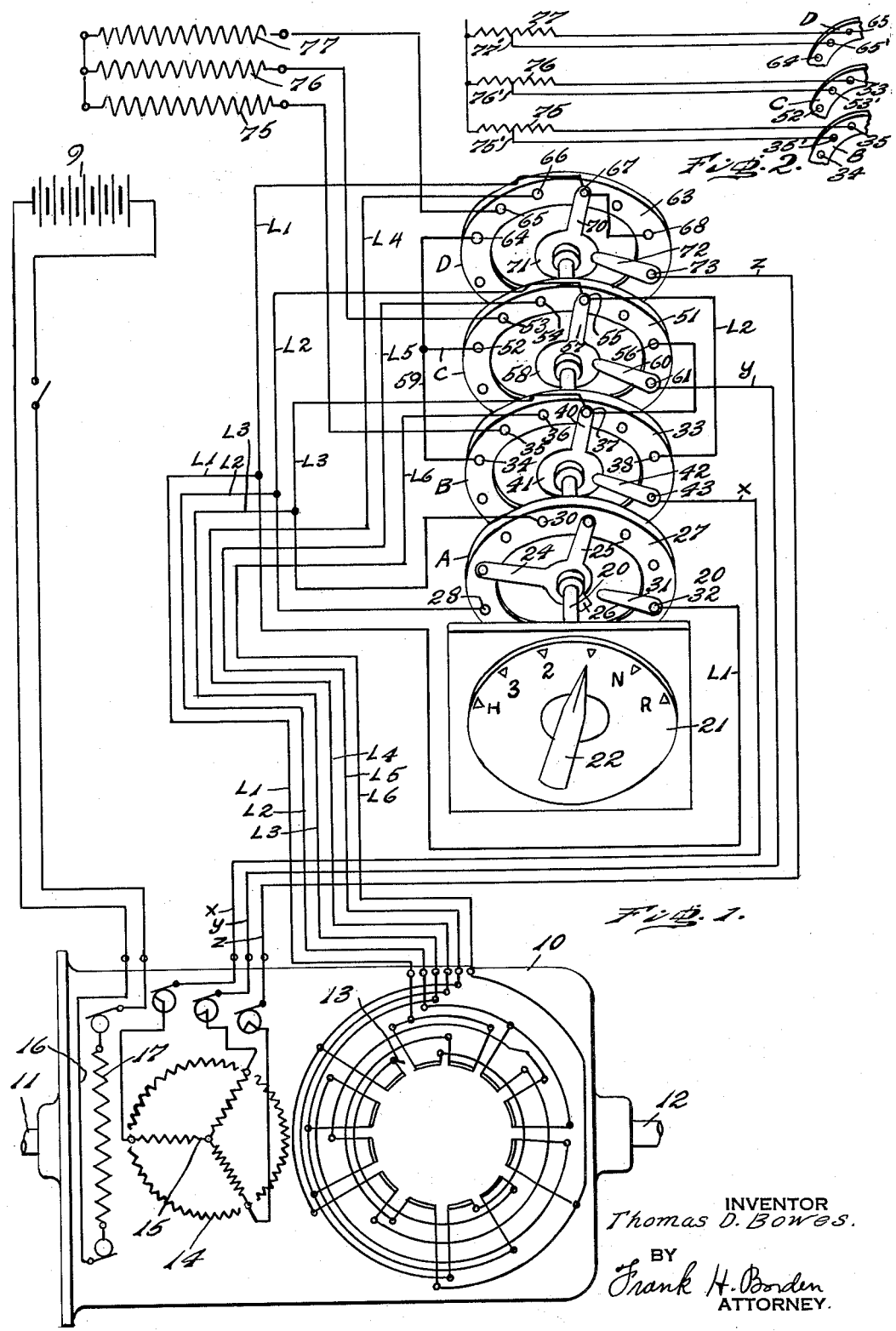

2,715,689

VARIABLE RATIO DYNAMOELECTRIC TRANSMISSION

Thomas D. Bowes, Bala-Cynwyd, Pa.

Application November 5, 1952, Serial No. 318,944

4 Claims. (Cl. 310—102)

This invention relates to transmissions of the electric coupling type, having selective predetermined different ratios of input to output.

In the patent to Bowes et al., No. 2,465,006, of March 22, 1949, there is disclosed a highly efficient dynamoelectric transmission device for association with a unidirectional substantially constant speed motor, such as a diesel or unidirectional turbine. The primary purpose and function of the patented invention is the utilization of the kinetic energy of a high speed rotor for the performance of mechanical work at an angular speed lower than, and at a torque higher than, those of the driving rotor, whereby a substantially constant ratio of input to output is secured under constant duty. This has had excellent results in commercial adaptations, effecting probably higher transmission efficiency with less power losses than any other known form of transmission. Although the patented device noted is susceptible to reversal, there is no provision nor possibility therein of obtaining more than one given ratio of input to output in the forward drive. The functioning, for efficiency, also requires a fairly constant high speed of input from the prime mover.

It is among the objects of this invention: to modify the invention of Patent No. 2,465,006 to effect selectively operable different ratios of input to output with substantially the same horse power transmitted in each ratio; to effect circuit organizations with a transmission such as is shown in said Bowes et al. patent, whereby the transmission ratios can be selectively controlled through control of the generator output leads of the transmission; to utilize a dynamoelectric transmission having a driving rotor of illustratively two poles, for coupling to a prime mover, which rotor constitutes a generator field which turns in a rotatably mounted armature of a generator coupled to or mounted on the output or driven shaft of the transmission, to generate polyphase current, and a motor of a selected number of poles, a multiple of the number of poles of the generator, as, for pure instance, eight poles, having a field and armature, one of which rotates with the armature of the generator, with output leads from the generator in a circuit-controlling system, wherein the output leads selectively: are coupled to feed the maximum number of poles of the motor, the illustrative eight poles, to effect a low or "1st" speed step analogous to "low gear," with a high ratio of input to output, i. e. of high torque and slow speed; are coupled to a minimum number of poles, i. e. one half of the poles of the motor, illustratively four poles, to effect a "2nd" speed step analogous to "second gear" ratio of different input to output, comprising one-half the torque and twice the speed of the low or "1st" gear ratio; and in both of which "gears" the transmission functions as a torque converter; are coupled through resistors and out of communication connectively with any poles of the motor to effect a "3rd" speed step analogous to "third gear," of a slip-clutch effect to facilitate the smooth transition step of the normal torque of the prime mover, or of vastly greater than normal torque, if such is available from the prime mover, and of higher speed than the "2nd" gear ratio; and are coupled in a short circuit connection as the resistances of the "3rd" gear are taken out, to establish a "4th" or "high" speed step analogous to "high" or "4th gear," or a substantially 1:1 ratio of a substantially normal prime mover torque and speed; to provide an electric transmission the ratios of input to output of which are selectively controllable despite wide variations in the input speed from a prime mover; to provide a changeable ratio transmission operable for selected ratios substantially regardless of the magnitude of load either on the prime mover or on the output shaft and without signals from the output of the transmission; and to provide other objects and advantages as will become apparent as the description proceeds.

In the accompanying drawing forming part of this description:

Fig. 1 represents a diagram of an illustrative form of the present invention, partially in isometric projection.

Fig. 2 represents a diagram of a modification of the disclosure of Fig. 1.

The preferred, but purely illustrative, form of the transmission disclosed incorporates a housing 10, provided for suitable anchorage in the line between the undisclosed prime mover, for coupling to the input or driving shaft 11, and the undisclosed load, for coupling to the output or driven shaft 12. Illustratively, the prime mover may be anything, such as any form of internal combustion or steam engine, an electric motor or the like. The load may be anything to be driven, such as machinery, pumps, propellers, or the like. Fixed within the housing 10 is the stator 13 of the motor part of the transmission, which has, illustratively, a two or more speed compound winding, illustratively, with two speed ratios, for four and eight poles, but which may be any desired number of such poles, such as six and twelve poles, ten and twenty poles, or the like. The generator poles may be more than two, as, for example, four, and the number of motor poles in both or all pole organizations is a multiple of the number of generator poles. The pole organization may comprise separate sets of windings. The input leads for the illustrative eight-pole organization are identified as L1, L2, L3, while the input leads for the illustrative four-pole motor organization are identified as L4, L5, and L6. Attached to the driven shaft 12 is a squirrel cage rotor 14 externally confronting the stator 13, and forming therewith a motor. By additional slip ring leads the motor organization can be reversed, with the squirrel cage as the fixed external member, but this is not preferred.

The driven shaft 12, internally of and on the squirrel cage also mounts a rotatable generator armature 15, having three slip ring output leads, respectively x, y, and z, for the respective three phases of output from the polyphase generator. The rotatable generator armature internally confronts the high speed rotor 16 of the system, and the latter, with whatever number of salient or other poles it may have, say, the illustrative two, has an exciting winding 17 energized through slip rings with D. C. current from any suitable source, such, for instance, as a battery 9.

The controlling unit of the system for convenience provides an oscillatable shaft 20 suitably journalled for the purpose, with reference to a dial 21 bearing calibrations, illustratively "H," "3," "2," "1," "N," and "R." A combined pointer and control knob 22 is mounted on the shaft 20 in front of the dial 21, for effecting illustrative manual control of the angular position of the shaft 20, according to the relation of the pointer to any given calibration. A series of switching members are mounted on the shaft for oscillation therewith relative to fixed insulating rings surrounding same, bearing contact terminals for leads to be described, and for selective contact-making engagement by movable switch elements to be described. Suitable indexing means (not shown) are provided to hold the shaft in each of its set angular positions.

The circuit controllers or switches, illustratively, are four in number, namely A, B, C, and D. Switch A comprises a movable portion including two divergent arms 24 and 25 and a partial inner sector 26. The arms and sector are insulated from shaft 20. The insulating ring member 27 of switch A has contacts 28 and 30, disposed to be simultaneously engaged by the respective arms 24 and 25 when the pointer knob is moved to point at indication "2," but to be out of contact therewith at all other shaft settings. A fixed wiper arm 31 is mounted on ring 27, from terminal 32 to wipe and establish contact with the partial sector 26 in said stated position (2) of the knob only, and no other. Terminal 28 connects to L2, contact 30 connects to L3, and contact 31 connects to L1.

Switch B comprises the fixed ring member 33 mounting contacts 34, 35, 36, 37, and 38, and the movable portion comprises a single wiping arm 40, insulated on the shaft 20 and including a wiping inner ring 41, constantly wiped and electrically engaged by the stationary wiping arm 42, from terminal 43 on the ring connected to generator output lead $x$. It will be seen that in the knob position illustrated, switch arm 40 engages contact 37, and engages contact 38 at R setting, contact 36 at "2," contact 35 at "3," and contact 34 at "H." Wiping arm 42 supplies phased generator output $x$, successively to the various recited output contacts of the switch as the shaft is shifted in angularity.

The third circuit controller C comprises the stationary insulating ring 51, mounting the contacts 52, 53, 54, 55 and 56, for selective engagement by the single movable arm element 57, insulated on the shaft 20 and carrying the integral inner wiping ring 58, in constant contact with the stationary wiping arm 60 from terminal 61. The latter is connected with the phase output lead $y$ from the generator and supplies this phase output to the various output contacts of switch C, as the shaft is angularly shifted.

The fourth circuit controller D comprises the stationary ring portion 63 which mounts contacts 64, 65, 66, 67, and 68, successively engaged by the single arm 70, insulated on the shaft 20, and having the inner bearing or wiping ring member 71, constantly engaged by stationary wiping arm 72 from terminal 73, and the latter is connected to the phase output $z$ to supply this phase to the output contacts of switch D.

Of the contacts on the three last mentioned circuit controllers, 34 of switch B, 52 of switch C, and 64 of switch D are connected together through a common connector 59. Contacts 35, 53, and 65 of switches B, C, and D, respectively are connected to resistances 75, 76, and 77. Contact 36 of switch B connects with L6; 54 of switch C connects with L5; and 66 of switch D connects with L4. Contact 37 of switch B connects both with L3 and with terminal 56 of switch C. Contact 55 of switch C connects with L2 and with contact 38 of switch B; and contact 67 of switch D connects with L1 and also with terminal 68 of switch D.

In operating the system it is generally preferred to move the control knob and pointer to N and thus the actuating shaft 20 to neutral position, thus removing all movable switch arms from all contacts. The prime mover is started. The knob is then turned to 1, (to the position shown) and synchronously the switch is closed from the D. C. source 9 through the field 17, to excite the generator rotor, and thus, by its rotation with the prime mover, to generate polyphase current in the generator armature, and simultaneously to transmit part of the prime mover torque to the generator armature and its output shaft by a slip clutch effect. At this juncture, by the switching arrangements shown, the generator output leads $x$, $y$, and $z$ are connected solely to the stator leads L1, L2, and L3, with L4, L5 and L6 of the stator open, the (illustrative) eight poles of the motor are energized, effecting the highest torque, slow speed transmission, consonant with "low" gear. This may be effective in initiating the mechanical work involved in overcoming the inertia of and bringing the stationary load to motion.

As the load is picked up and set into motion, or in any case, when a different ratio is desired, the knob is moved to set the pointer and shaft on the "2" calibration. This, through switch A, connects L1 with L2 and L3 in a shorted connection, through switch B connects output lead $x$ with L6, through switch C connects output lead $y$ with L5, and through switch D connects output lead $z$ with L4. This cuts the active poles in the motor in half, illustratively from eight to four, reducing the torque on driven shaft and increasing the speed thereof. This accelerates the load motion.

When it is desired to change to the "3rd" ratio, the knob and pointer is turned to 3, which, through switches B, C, and D connects the generator output leads $x$, $y$, and $z$ respectively with the resistances 75, 76, and 7. This cuts the motor leads completely out and the driven rotor drives the generator armature as a magnetic slip clutch. While the load never reaches full speed with this ratio, the transition of the normal torque of the prime mover, or of vastly greater than normal torque, if such is available from the prime mover, is facilitated, with increased speed, but with predetermined slippage as a function of the input resistances.

When changing to the "4th" or "high" ratio, the knob is turned till the pointer is over "H." This directly shorts out output leads $x$, $y$, and $z$, through the interconnections of contacts 34, 51, and 63 of switches B. C. and D. This establishes the transmission as a magnetic clutch having some slip but not as much as in the "3rd" ratio.

Finally, it will be seen that for reversing the drive the knob is turned to "R," and as reversing is only accomplished with the eight pole arrangement of the motor poles, the connection of output lead $z$ to L1 is maintained, while the leads from $y$ and $x$ are reversed and lead respectively to L3 and L2. This reverses the transmission drive.

It will be apparent that the resistances in the generator ouput lines introduced in step 3, of third ratio, may desirably be removed more or less gradually in progressing to step 4, or "H." If this is desired, it is easily accomplished by a slight change in the wiring and the switching systems, as fragmentarily indicated in Fig. 2, purely for illustrative purposes. In most cases the removal of the resistances can be effected as sufficiently gradual if performed in an illustrative two steps, but more than two can be resorted to if desired, as will be clear. To this end, each resistance has a tap connection furnishing a lead for an additional contact for mounting on the respective switches. Thus, resistance 75 has a tap connection 75' for connection to a switch contact 35' to be mounted on switch B between contacts 35 and 34, resistance 76 has a tap connection 76' for connection to a contact 53' to be mounted on switch C between contacts 53 and 62, and resistance 77 has a tap connection 77' for connection to a contact 65' to be mounted on switch D between contacts 65 and 64.

In switching from 2nd to 3rd, the generator leads are coupled to the full resistances. In switching from 3rd to high, the generator leads are shifted from the full resistances to substantially one-half of the resistance or whatever portion is determined by the tap connection, preliminary to the actual switching for high. This makes the transition of the torque smoother.

It will be seen that many modifications may be resorted to in specific exemplifications of the invention. For instance, it is pointed out that the transition from one ratio to another may be an automatic function of the instantaneous load on the motor as in application Ser. No. 318,945, filed of even date herewith, or as an automatic function of the instantaneous load on the output shaft of the transmission, or by signals from the latter.

It will be apparent further that related results may be achieved in a transmission system in which the motor parts are synchronous instead of asynchronous as illustrated for instance by suitable adaptations of the transmission shown in Bowes et al. Patent No. 2,563,577, of August 7, 1951.

Finally, it will also be evident that pursuant to the teachings of the invention, with suitable windings, different sets of generator poles may be utilized with proper switching to change the ratios of input to output of the transmission, either with the motor having but one set of poles, or having multiple sets of poles. With both motor and generator having multiple sets of pole combinations, it will be seen that the range of torque and speed step selections is greatly amplified. It will, of course, also be recognized that any one or two of the recited torque and speed steps disclosed can be omitted if for any reason this should be desired.

Having thus described my invention, I claim:

1. A dynamoelectric transmission comprising a driven rotor, a rotatable generator armature in operative relation to the rotor, a rotatable motor member and a stator motor member, said stator member having related windings with input leads for a maximum multipole motor energization or selectively for a minimum pole motor energization, means for selectively energizing the respective input leads from the generator output to selectively establish the ratio of drive between the driven rotor and the rotatable motor member, and means for synchronously short-circuiting the connections of the minimum motor pole organization as the connections for the maximum motor pole organization are coupled to the generator output.

2. Power transmitting mechanism comprising a three phase generator having complementary field and armature members both of which are rotatable, a motor suppliable with three phase current from said generator and having complementary field and armature members, one of said motor members being mechanically connected with one of said generator members, said motor having windings respectively establishing a maximum and a minimum number of poles, circuit controlling means comprising a plurality of individual switch means, first means establishing input leads for said maximum poles and mounted respectively on the respective individual switch means, second means establishing input leads for said minimum poles and mounted respectively on the respective individual switch means, said circuit-controlling means operative for selectively switching the output of said generator to said first input leads while short circuiting the second input leads to establish one ratio of power transmission and for switching the said generator output to said second input leads to establish a different ratio of power transmission.

3. Power transmitting mechanism comprising a three phase generator having complementary field and armature members both of which are rotatable, a motor suppliable with three phase current from said generator over three phased conductors and having complementary field and armature members, one of said motor members being mechanically connected with one of said generator members, said motor having windings respectively establishing a maximum and a minimum number of poles, circuit controlling means comprising a plurality of individual switch means respectively connected to the respective phased conductors, first means establishing input leads for said maximum poles and mounted respectively on the respective individual switch means, second means establishing input leads for said minimum poles and mounted respectively on the respective individual switch means, said circuit-controlling means operative for selectively switching the output of said generator to said first input leads while short circuiting the second input leads to establish one ratio of power transmission and for switching the said generator output to said second input leads to establish a different ratio of power transmission from said first mentioned ratio, resistance means connected to said respective individual switch means, said circuit-controlling means operable to disconnect the output from said generator from both said first and second mentioned motor input means and into said resistance means to establish a third ratio of power transmission.

4. Power transmitting mechanism comprising a three phase generator having complementary field and armature members both of which are rotatable, a motor suppliable with three phase current from said generator over three phased conductors and having complementary field and armature members, one of said motor members being mechanically connected with one of said generator members, said motor having windings respectively establishing a maximum and a minimum number of poles, circuit controlling means comprising a plurality of individual switch means respectively connected to the respective phased conductors, first means establishing input leads for said maximum poles and mounted respectively on the respective individual switch means, second means establishing input leads for said minimum poles and mounted respectively on the respective individual switch means, said circuit-controlling means operative for selectively switching the output of said generator to said first input leads while short circuiting the second input leads to establish one ratio of power transmission and for switching the said generator output to said second input leads to establish a different ratio of power transmission from said first mentioned ratio, resistance means connected to said respective individual switch means, said circuit-controlling means operable to disconnect the output from said generator from both said first and second mentioned motor input means and into said resistance means to establish a third ratio of transmission of input to output of said transmission, and said circuit-controlling means operable to disconnect said output from said generator to said resistance means and to short circuit same to establish still a further different power transmission ratio.

References Cited in the file of this patent

UNITED STATES PATENTS

| | | |
|---|---|---|
| 1,092,797 | Mavor | Apr. 7, 1914 |

FOREIGN PATENTS

| | | |
|---|---|---|
| 6,805 | Great Britain | of 1915 |
| 7,933 | Great Britain | of 1907 |